US012631241B1

(12) United States Patent
Wang et al.

(10) Patent No.: US 12,631,241 B1
(45) Date of Patent: May 19, 2026

(54) ELECTRIC DRUM

(71) Applicant: Jiangsu Winroller Transmission Technology Co., LTD, Jiangsu (CN)

(72) Inventors: Pu Wang, Jiangsu (CN); Xinjun Xue, Jiangsu (CN)

(73) Assignee: Jiangsu Winroller Transmission Technology Co., LTD, Jiangsu (CN)

( * ) Notice: Subject to any disclaimer, the term of this patent is extended or adjusted under 35 U.S.C. 154(b) by 0 days.

(21) Appl. No.: 19/098,133

(22) Filed: Apr. 2, 2025

(30) Foreign Application Priority Data

Jan. 16, 2025 (CN) .......................... 202510067837.6

(51) Int. Cl.
*F16H 1/46* (2006.01)
*F16H 57/04* (2010.01)

(52) U.S. Cl.
CPC ........... *F16H 1/46* (2013.01); *F16H 57/0431* (2013.01); *F16H 57/0486* (2013.01); *F16H 57/0464* (2013.01)

(58) Field of Classification Search
CPC .... F16H 1/46; F16H 57/0431; F16H 57/0486; F16H 57/0464
See application file for complete search history.

(56) References Cited

U.S. PATENT DOCUMENTS

| 5,345,840 A * | 9/1994 | Frost ................. B60K 17/3467 74/665 GA |
| 9,307,687 B2 * | 4/2016 | Ruppel ................ A01B 33/082 |
| 9,903,462 B2 * | 2/2018 | Hu ............................ F16H 1/46 |
| 2009/0275439 A1 * | 11/2009 | Kersting ................... B60K 6/40 475/5 |
| 2011/0196375 A1 * | 8/2011 | Li .......................... H02K 7/116 475/275 |
| 2013/0095974 A1 * | 4/2013 | Imai ......................... F02C 7/36 475/159 |
| 2013/0274049 A1 * | 10/2013 | Zhu ........................... F16H 1/46 475/149 |
| 2018/0291984 A1 * | 10/2018 | Lundbäck ............. F16H 1/2863 |
| 2019/0056016 A1 * | 2/2019 | Hall ........................ F16H 39/36 |

* cited by examiner

*Primary Examiner* — Farhana Pervin
(74) *Attorney, Agent, or Firm* — SALIWANCHIK, LLOYD & EISENSCHENK

(57) ABSTRACT

The present invention relates to an electric drum, which comprises a dual-gear reduction mechanism that comprises at least one stage of sun dual-gear, N planetary dual-gear sets and a gear ring; the at least one stage of sun dual-gear is coaxially arranged with an output gear shaft of a motor; the N planetary dual-gear sets surround the at least one stage of sun dual-gear, and the structure of each planetary dual-gear set comprises a planetary pin, on which at least one stage of planetary dual-gears and an output planetary gear are sequentially sleeved in an axial direction; two ends of the planetary pin are fixedly connected with fixing parts in the drum body; the various stages of sun dual-gears are sequentially engaged with the planetary dual-gears, and finally the drum body is driven to rotate via the engagement between the output planetary gear and the gear ring; the N planetary dual-gears in each stage are evenly distributed around the sun dual-gear, and N is greater than or equal to 3. The present invention improves the structural stability of the reduction mechanism, reduces the number of parts, decreases the temperature rise and noise of the drum, and improves the stability and reliability of operation.

21 Claims, 5 Drawing Sheets

9

81    82

ELECTRIC DRUM

CROSS REFERENCE TO A RELATED APPLICATION

This application claims priority to Chinese Patent Application No. 2025100678376, filed Jan. 16, 2025; which is hereby incorporated by reference in its entirety.

TECHNICAL FIELD

The present invention relates to the technical field of drums, in particular to an electric drum.

BACKGROUND ART

In the prior art, electric drums driven by multi-stage dual reduction gear often employ a single-side external engaging transmission mode, in which each stage of sun gear is only fitted with one planetary gear, i.e., only one planetary gear is arranged in the circumferential direction. Such a structural design has some limitations: the stress on the sun gear is uneven, so it is necessary to arrange corresponding gear carriers and gear rings to fit with the planetary gears, so as to meet the demand for multi-stage reduction. Consequently, the following problems exist: the required positional accuracy of the gear carriers is high, bringing inconvenience to processing and assembly. Owing to the large numbers of gear carriers and gear rings, the temperature rise of the drum is high and the noise is high. The planetary gears revolve while rotating, and a large part of the space inside the gearbox is wasted, so threading is impossible.

CONTENTS OF THE INVENTION

In view of the drawbacks in the prior art, the present invention provides an electric drum for the purpose of improving the structural stability of a reduction mechanism, reducing the number of parts, decreasing the temperature rise and noise of the drum, and improving the stability and reliability of operation.

The technical scheme employed in the present invention is as follows:

An electric drum, comprising a drum body, wherein, the drum body is provided with a motor and a dual-gear reduction mechanism connected with the motor in transmission way, and an output end of the dual-gear reduction mechanism is connected with the drum body, the structure of the dual-gear reduction mechanism comprises at least one stage of sun dual-gear, N planetary dual-gear sets and a gear ring;

the at least one stage of sun dual-gear is coaxially arranged with an output gear shaft of the motor;

the N planetary dual-gear sets surround the at least one stage of sun dual-gear, and the structure of each planetary dual-gear set is:

each planetary dual-gear set comprises a planetary pin, on which at least one stage of planetary dual-gears and an output planetary gear are fitted sequentially in an axial direction;

two ends of the planetary pin are fixedly connected with fixing parts in the drum body;

the planetary pins of the N planetary dual-gear sets are arranged in parallel;

wherein, input tooth segments of the N first-stage planetary dual-gears are engaged with the output gear shaft simultaneously in a transmission mode, and are evenly distributed along a circumference centered on the output gear shaft; output tooth segments of the N first-stage planetary dual-gears are engaged with an input tooth segment of the first-stage sun dual-gear simultaneously in a transmission mode, an output tooth segment of the first-stage sun dual-gear is engaged with input tooth segments of N second-stage planetary dual-gears simultaneously in a transmission mode, output tooth segments of the N second-stage planetary dual-gears are engaged with an input tooth segment of the second-stage sun dual-gear simultaneously in a transmission mode, till an output tooth segment of the last-stage sun dual-gear is engaged with N output planetary gears simultaneously in a transmission mode, the N output planetary gears are engaged with the gear ring simultaneously in a transmission mode, and the gear ring is connected with the drum body and arranged coaxially with the drum; wherein $N \geq 3$.

Further technical schemes are as follows:

Each planetary pin is in clearance fit with the planetary dual-gears sleeved thereon;

an end face of at least one end of the planetary dual-gear is provided with an oil guide groove, one end of the oil guide groove is in communication with an inner hole of the planetary dual-gear for fitting with the planetary pin, and the other end of the oil guide groove is in communication with an outer circumferential wall of the planetary dual-gear.

The sun dual-gear has a solid gear structure without any inner hole.

The fixing parts at the two ends of the planetary pin are provided with axial limiting surfaces, which respectively limit the at least one stage of planetary dual-gears and the output planetary gear on the planetary pin in the axial direction.

The fixing parts comprise a stator bracket and a threading shaft bracket that are respectively located at two ends of the drum body;

the stator bracket is fitted with the output gear shaft in the interior via a bearing component, one external end of the stator bracket is used for mounting the stator of the motor, and the other external end of the stator bracket is provided with a connecting part; and a threading channel is formed inside the threading shaft bracket, and the threading shaft bracket is connected externally with a support sleeve via a bearing component, and the support sleeve is connected and arranged coaxially with the drum body.

The connecting part is externally fitted with a reduction housing via a bearing component; the reduction housing is connected with one end of the support sleeve, and the other end of the support sleeve is connected with a cover to seal the drum body.

The gear ring is located on an inner wall of the support sleeve, and the gear ring and the support sleeve are fixedly connected or integrally formed.

The planetary pin is fixedly connected with the fixing parts via a cage-type gear box support;

the cage-type gear box support has an internal space accommodating the at least one-stage of sun dual-gear and the N planetary dual-gear sets;

two ends of the cage-type gear box support are respectively connected with the fixing parts;

the two ends of the cage-type gear box support are correspondingly provided with assembly holes, for tightly fitting with the planetary pin;

one or more connecting posts are arranged on the circumferential side of the cage-type gear box support, and a threading channel is formed in the connecting post.

One or more threading tubes are arranged in the drum body, and two ends of each threading tube are respectively connected with the fixing parts.

The motor is an inner-rotor motor or an outer-rotor motor.

The present invention has the following beneficial effects:

In the present invention, the at least one stage of sun dual-gear is located at the center of the reduction structure, and the sun dual-gear is engaged with at least three planetary dual-gears (or output planetary gears) evenly distributed around the circumference of the sun dual-gear; compared with the conventional single-side external engaging transmission, the stress uniformity is greatly improved, and the operation noise is reduced.

In the present invention, at least one stage of planetary dual-gears and the output planetary gear of each planetary dual-gear set are connected in series on the same planetary pin, i.e., they share a planetary pin. The planetary pins of the planetary dual-gear sets are arranged in parallel at an interval and at fixed positions, so that at least three planetary dual-gears (or output planetary gears) evenly distributed in the circumferential direction have a constant center distance, and all planetary gears rotate without revolution; thus, a space for threading in the reduction gearbox is provided, and it is only required to arrange a gear ring at the output position, thereby the heat source of temperature rise of the drum is reduced, and the noise is reduced. Besides, the remaining space in the reduction housing is reduced, and grease can be used for lubrication, so as to avoid the risk of oil leakage. In addition, each stage of planetary gears share a planetary pin, thereby the shortcomings of a conventional planetary reduction structure, such as multiple toothed discs and a large number of parts, are solved, and the problem of inconvenient processing and installation caused by the high requirement on installation location degree of a conventional gear carrier is avoided.

In the present invention, each planetary dual-gear is provided with an oil guide groove, so that lubricating grease can be further introduced into the fitting clearance, thereby the cooling effect is improved.

In the present invention, the sun dual-gear is engaged with planetary dual-gears and output planetary gears evenly distributed around the sun dual-gear, thereby axial limiting and radial limiting of the sun dual-gear are realized, so that the position can be kept stable without an axle, and the number of parts is reduced.

Other features and advantages of the present invention will be set forth in the following description, or may be learned by practice of the present invention.

In the figures: 1. gear shaft connecting frame; 2—stator; 3—output gear shaft; 4—power wire; 5—cage-type gear box support; 6—planetary pin; 7—cable; 8—first-stage planetary dual-gear; 9—first-stage sun dual-gear; 10—second-stage planetary dual-gear; 11—output sun dual-gear; 12—output planetary gear; 13—gear ring; 14—drum body; 15—threading shaft bracket; 16—reduction housing; 17—second-stage sun dual-gear; 18—third-stage planetary dual-gear; 19—stator bracket; 20—cover; 21—threading tube; 51—connecting post; 52—assembly hole; 81—oil guide groove; 82—inner hole; 131—support sleeve; 191—connecting part; 301—PCB board; 511—threading channel.

EMBODIMENTS

Specific embodiments of the present invention will be described below with reference to the accompanying drawings.

Example 1

Figure 1:
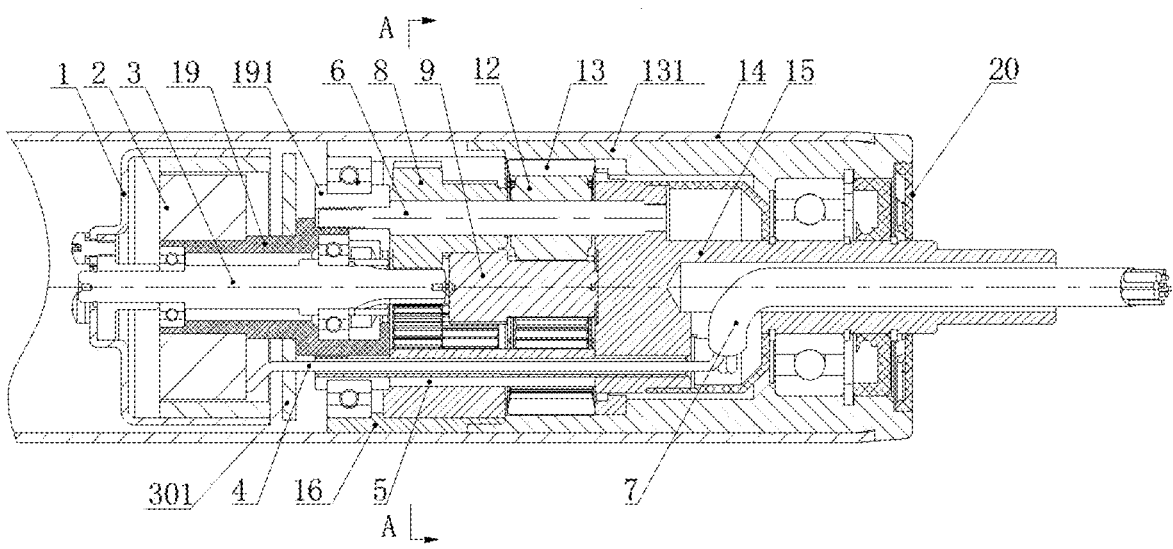
FIG. 1 is a schematic structural diagram of Example 1 of the present invention.
Figure 2:
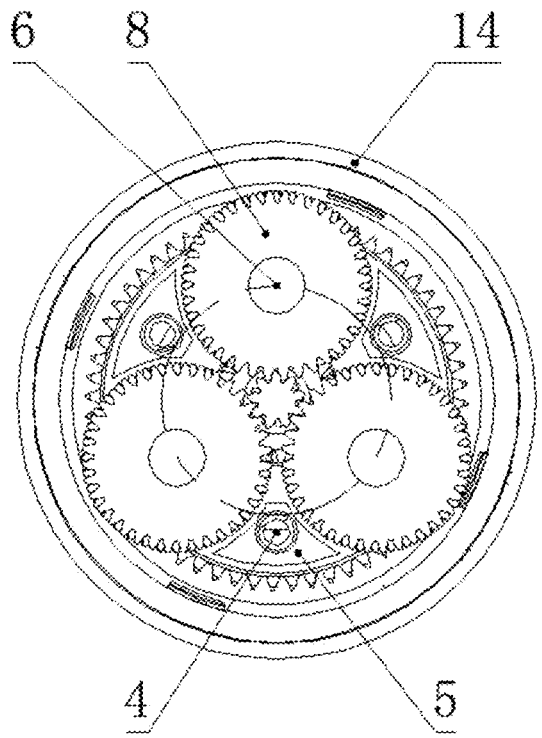
FIG. 2 is a cross-sectional view taken along the line A-A in FIG. 1.

As shown in FIGS. 1 and 2, the electric drum in this example, comprises a drum body 14, the drum body 14 is provided with a motor and a dual-gear reduction mechanism connected with the motor in transmission way, and an output end of the dual-gear reduction mechanism is connected with the drum body 14, and the structure of the dual-gear reduction mechanism comprises at least one stage of sun dual-gear, N planetary dual-gear sets and a gear ring 13;

the at least one stage of sun dual-gear is coaxially arranged with an output gear shaft 3 of the motor;

the N planetary dual-gear sets surround the at least one stage of sun dual-gear, and the structure of each planetary dual-gear set is:

each planetary dual-gear set comprises a planetary pin 6, on which at least one stage of planetary dual-gears and an output planetary gear 12 are fitted sequentially in an axial direction;

two ends of the planetary pin 6 are fixedly arranged, and can be directly fixedly connected with the fixing parts in the drum body 14 or fixedly arranged via a cage-type gear box support 5;

the planetary pins 6 of the N planetary dual-gear sets are arranged in parallel;

wherein the at least one stage of planetary dual-gears comprises first-stage planetary dual-gears 8, and the at least one stage of sun dual-gear comprises a first-stage sun dual-gear 9;

The output gear shaft 3 is the output shaft of the motor, and its output end is provided with external teeth, input tooth segments of the N first-stage planetary dual-gears 8 are simultaneously engaged with the output gear shaft 3, and are evenly distributed along a circumference centered on the output gear shaft 3; output tooth segments of the N first-stage planetary dual-gears 8 are simultaneously engaged with the input tooth segments of the first-stage sun dual-gear 9, to realize first-stage gear reduction; the first-stage sun dual-gear 9 also serves as a last-stage sun dual-gear, and its output tooth segments are simultaneously engaged with the input tooth segments of the N output planetary gears 12, to realize second-stage gear reduction, the output tooth segments of the N output planetary gears 12 are simultaneously engaged with the gear ring 13, the gear ring 13 is connected and coaxially arranged with the drum body 14, thereby the torque after gear reduction is outputted to the drum body 14.

In this example, owing to the reasonable structural design, it is only required to arrange a gear ring at the output position of the reduction mechanism regardless of the number of stages of reduction, thus the heat source of temperature rise of the drum body is greatly reduced, and the noise is reduced.

As a specific embodiment, N is equal to 3, alternatively, N can also be set to 4 or a greater value as required. Three first-stage planetary dual-gears 8 and three output planetary gears 12 respectively surround and are engaged with the central first-stage sun dual-gear 9, and the first-stage sun dual-gear 9 is engaged at three places on the circumference, the stress is uniform, the noise problem caused by uneven stress in the case of single-side engaging is prevented, and the reliability and stability of the reduction mechanism are improved. At the same time, owing to the engagement at three places, the internal space of the reduction mechanism is reduced, and it is convenient to lubricate with grease, and the problem of oil leakage caused by oil lubrication is avoided.

Figure 3:
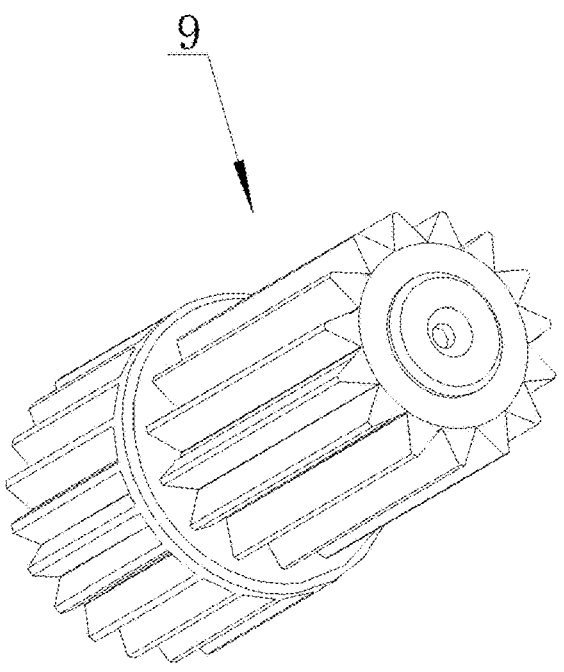
FIG. 3 is a schematic structural diagram of the sun dual-gear according to the example of the present invention.

In addition, the first-stage sun dual-gear 9 is engaged with planetary dual-gears and output planetary gears evenly distributed around the sun dual-gear, thereby axial limiting and radial limiting of the first-stage sun dual-gear 9 are realized, so that the position can be kept stable without an axle. Therefore, the specific structure of the sun dual-gear in this example is shown in FIG. 3, comprising an input tooth segment and an output tooth segment that are coaxially arranged, and the entire sun dual-gear is a solid gear structure without any inner hole.

Figure 4:
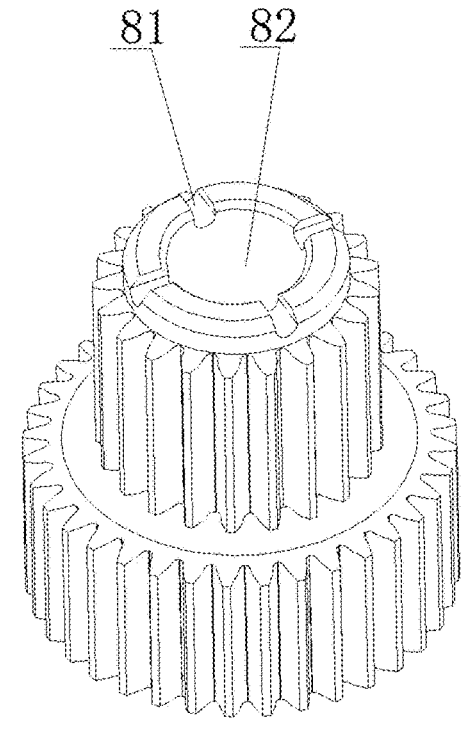
FIG. 4 is a schematic structural diagram of the planetary dual-gear according to the example of the present invention.

In this example, each planetary pin 6 is in clearance fit with the planetary dual-gears sleeved thereon, so as to ensure that grease can enter the fitting clearance. As shown in FIG. 4, the structure of the planetary dual-gear in this example comprises an input tooth segment and an output tooth segment that are coaxially arranged, the end face of at least one end of the planetary dual-gear is provided with an oil guide groove 81, one end of the oil guide groove 81 is in communication with an inner hole 82 of the planetary dual-gear for fitting with the planetary pin 6, and the other end of the oil guide groove 81 is in communication with an outer circumferential wall of the planetary dual-gear. Through the oil guide grooves 81, lubricating grease can be further introduced into the fitting clearance, and the cooling effect can be improved.

A plurality of oil guide grooves 81 are evenly distributed in the circumferential direction; and each oil guide groove 81 extends in the radial direction.

Preferably, the number of the oil guide grooves 81 is N, i.e., corresponding to the number of planetary dual-gear sets. Thus, lubrication of all the gears in each set can be ensured.

As shown in FIG. 1, the fixing parts comprise a stator bracket 19 and a threading shaft bracket 15 that are respectively located at two ends of the drum body 14;

an internal space of the stator bracket 19 is fitted with the output gear shaft 3 via a bearing component, one external end of the stator bracket 19 is used for mounting the stator 2 of the motor, and the other external end of the stator bracket 19 is provided with a connecting part 191;

a threading channel is formed inside the threading shaft bracket 15, and the threading shaft bracket 15 is connected externally with a support sleeve 131 via a bearing component, and the support sleeve 131 is connected and arranged coaxially with the drum body 14.

The connecting part 191 is externally fitted with a reduction housing 16 via a bearing component; and the reduction housing 16 is connected with one end of the support sleeve 131, and the other end of the support sleeve 131 is connected with a cover 20 to seal the drum body 14, thus forming a sealed space for accommodating the dual-gear reduction mechanism.

As shown in FIGS. 1, 2, 7 and 8, in this example, the planetary pins 6 are fixedly connected with the fixing parts via the cage-type gear box support 5.

The cage-type gear box support 5 has an internal space accommodating the at least one-stage of sun dual-gear and the N planetary dual-gear sets;

the two ends of the cage-type gear box support 5 are correspondingly provided with assembly holes 52 for tightly fitting with the planetary pin 6; and one or more connecting posts 51 are arranged on the circumferential side of the cage-type gear box support 5, and a threading channel 511 is formed in the connecting post 51.

Two ends of the cage-type gear box support 5 are respectively connected with the fixing parts.

The two ends of the cage-type gear box support 5 can be used for axially limiting the first-stage planetary dual-gears 8 and the output planetary gears 12.

Specifically, the end face of the cage-type gear box support 5 is provided with a sink groove, and can be fixed to the connecting part 191 and the threading shaft bracket 15 by means of press-fitting or bolting, etc.

Since the position of the planetary pin is fixed, the various stages of the planetary dual-gears and the output planetary gear in each planetary dual-gear set rotate without revolution, so that the planetary gears have a constant center distance between them in the circumferential direction. A stable threading space is formed in the reduction housing, which is convenient for leading a cable through the reduction housing. Therefore, in this example, a threading channel 511 can be provided in the connecting post 51 of the cage-type gear box support 5. The cable 7 (including a power wire 4, a control wire, a signal wire, etc.) of the electric drum are led through the threading channel in the threading shaft bracket 15, then are led through the threading channel 511 of the connecting post 51, and finally are connected to the motor.

Figure 8:
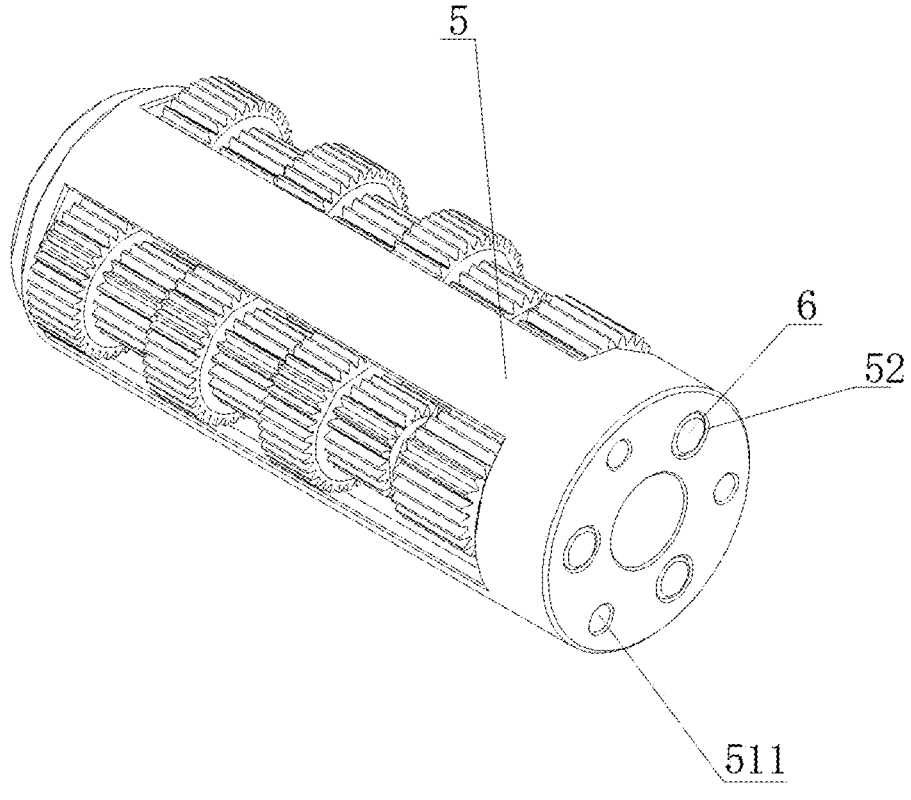
FIG. 8 is a schematic structural diagram illustrating the arrangement of the cage-type gear box support and at least one stage of sun dual-gear and N planetary dual-gear sets according to the example of the present invention.

In FIG. 8, at least one stage of sun dual-gear and the N planetary dual-gear sets in the cage-type gear box support 5 form a multi-stage reduction structure. See Example 2 for the details.

As a specific embodiment, the gear ring 13 is located on the inner wall of the support sleeve 131, and the gear ring 13 and the support sleeve 131 are fixedly connected or integrally formed. As a specific embodiment, interference press-fit is formed between the reduction housing 16 and the support sleeve 131.

As a specific embodiment, the support sleeve 131 and the drum body 14 are fixedly connected by means of interference press-fitting or welding, etc.

The part of the threading shaft bracket 15 extending out of the drum body 14 can be used fixed equipments such as frame fixed to drum conveyor line.

The motor in this example is an inner-rotor motor or an outer-rotor motor. For example, in the case of an outer-rotor motor, as shown in FIG. 1, the magnetic steel of the motor is arranged on the inner wall of a gear shaft connecting frame 1, and a PCB board 301 of the motor is sleeved on the stator bracket 19.

Example 2

Figure 5:
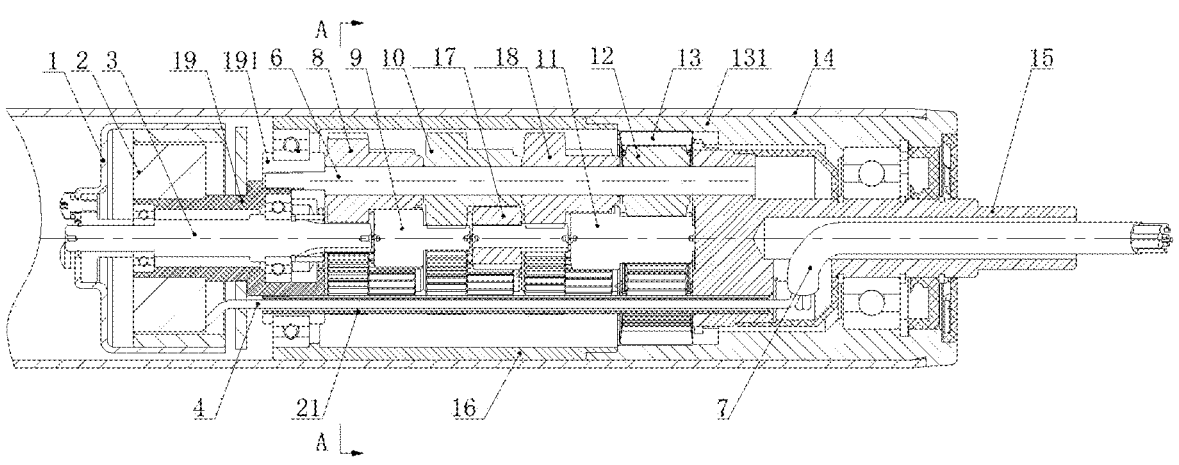
FIG. 5 is a schematic structural diagram of Example 2 of the present invention.
Figure 6:
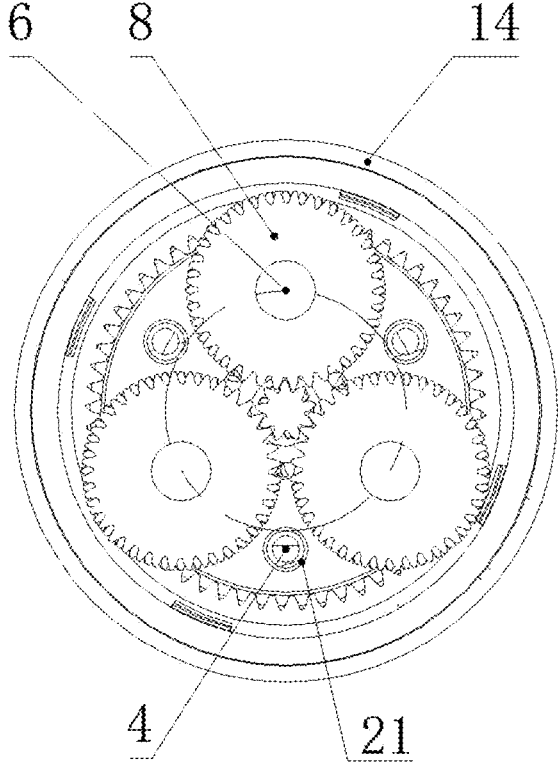
FIG. 6 is a cross-sectional view taken along the line A-A in FIG. 5.
Figure 7:
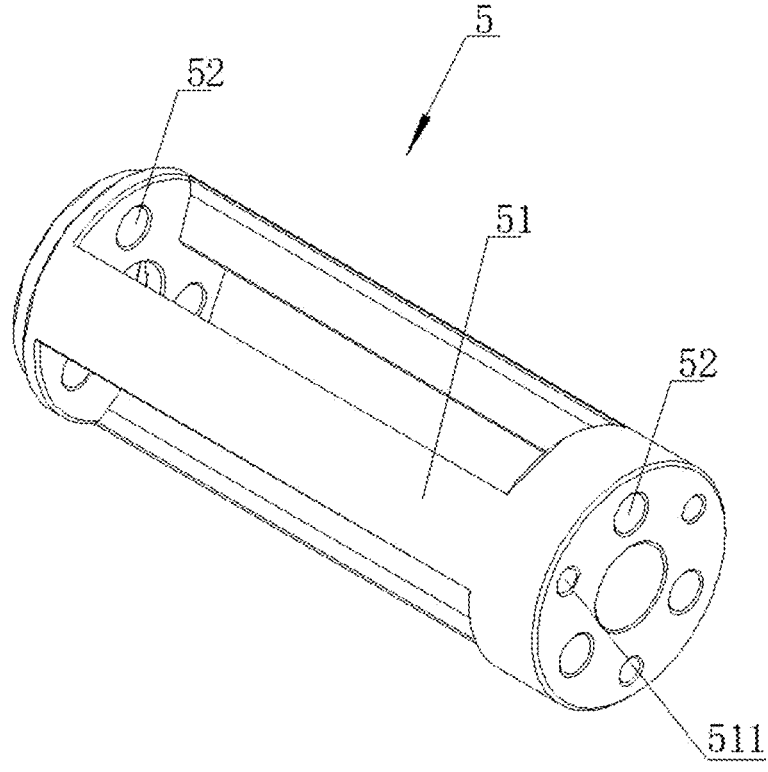
FIG. 7 is a schematic structural diagram of the cage-type gear box support according to the example of the present invention.

As shown in FIGS. 5 and 6, compared with the Example 1, the electric drum in this example has the same design principle and concept for the whole structure, but the number of transmission stages of the reduction mechanism is increased, and more stages of reduction are realized.

The differences between the electric drum in this example and the electric drum in Example 1 specifically include:

The at least one stage of planetary dual-gear further comprises second-stage planetary dual-gears 10 and third-stage planetary dual-gears 18;

The at least one stage of sun dual-gear further comprises a second-stage sun dual-gear 17 and an output sun dual-gear 11;

The first-stage planetary dual-gears 8, the second-stage planetary dual-gears 10, the third-stage planetary dual-gears 18 and the output planetary gear 12 are sequentially sleeved on the same planetary pin 6; the first-stage sun dual-gear 9, the second-stage sun dual-gear 17 and the output sun dual-gear 11 are sequentially arranged in the axial direction, and coaxial with the output gear shaft 3.

Wherein, the various stages of the sun dual-gears have the same structure, as shown in FIG. 3. The various stages of the planetary dual-gears have the same structure, as shown in FIG. 4.

Wherein, the input tooth segments of the N first-stage planetary dual-gears 8 are engaged with the output gear shaft 3 simultaneously in a transmission mode, and are evenly distributed along a circumference entered on the output gear shaft 3; the output tooth segments of the N first-stage planetary dual-gears 8 are simultaneously engaged with the input tooth segments of the first-stage sun dual-gear 9, to realize first-stage transmission; the output tooth segments of the first-stage sun dual-gear 9 are simultaneously engaged with the input tooth segments of the N second-stage planetary dual-gears 10, to realize second-stage transmission; the output tooth segments of the N second-stage planetary dual-gears 10 are simultaneously engaged with the input tooth segments of the second-stage sun dual-gear 17, to realize third-stage transmission; the second-stage sun dual-gear 17 is simultaneously engaged with the input tooth segments of the N third-stage planetary dual-gears 18, to realize fourth-stage transmission; the output tooth segments of the N third-stage planetary dual-gears 18 are simultaneously engaged with the input tooth segments of the output sun dual-gear 11, to realize fifth-stage transmission; the output sun dual-gear 11 serves as a last-stage sun dual-gear, and its output tooth segments are simultaneously engaged with the N output planetary gears 12 in a transmission mode, to realize sixth-stage transmission, and the N output planetary gears 12 are simultaneously engaged with the gear ring 13.

The three-dimensional structure of the above multi-stage gear reduction structure can be seen in the structure in the cage-type gear box support 5 in FIG. 8.

In addition to the above differences, in this example, the two ends of the planetary pin 6 are directly and fixedly connected with the connecting part 191 of the stator bracket 19 and the threading shaft bracket 15, which is to say, this example can not be provided with the cage-type gear box support 5.

The two ends of the planetary pin 6 can be provided with threads or hexagonal steps.

The inner end face of the connecting part 191 of the stator bracket 19 and the inner end face of the threading shaft bracket 15 form axial limiting surfaces, for axially limiting the at least one stage of planetary gear sets and the output planetary gears 12.

Since the cage-type gear box support 5 is not set, in order to realize threading, in this example, one or more threading tubes 21 are directly arranged in the drum body 14, and two ends of each threading tube 21 are respectively connected with the stator bracket 19 and the threading shaft bracket 15.

As a specific embodiment, as shown in FIG. 6, the threading tube 21 is located between two planetary dual-gears sets adjacent to each other in the circumferential direction, and is arranged in parallel with the planetary pin 6. The cross section of the threading tube 21 can be configured into a circular shape. The cables 7 (including a power wire 4, a control wire, a signal wire, etc.) of the electric drum are led through the threading channel in the threading shaft bracket 15, then are led through the threading channel 511 of the connecting post 51, and finally are connected to the motor.

It can be understood that the number of teeth, modulus, radius and other parameters of the various stages of the sun dual-gears, the planetary dual-gears and the output planetary gears can be set specifically according to the gear reduction requirements.

Those skilled in the art can easily understand: the above described are only some preferred examples of the present invention, and should not be deemed as constituting any limitation to the present invention. Although the present invention is described and illustrated above in detail with respect to the examples, those skilled in the art can make modifications to the technical scheme described above in the examples or make equivalent replacements of some technical features. Any modification, equivalent replacement, or improvement made to the examples, without departing from the spirit and the principle of the present invention, shall be deemed as falling into the scope of protection of the present invention.

We claim:

1. An electric drum, comprising a drum body, wherein, the drum body is provided with a motor and a dual-gear reduction mechanism connected with the motor in transmission way, and an output end of the dual-gear reduction mechanism is connected with the drum body, wherein the structure of the dual-gear reduction mechanism comprises at least one stage of sun dual-gear, N planetary dual-gear sets and a gear ring;

the at least one stage of sun dual-gear is coaxially arranged with an output gear shaft of the motor;

the N planetary dual-gear sets surround the at least one stage of sun dual-gear, and the structure of each planetary dual-gear set is:

each planetary dual-gear set comprises a planetary pin, on which at least one stage of planetary dual-gears and an output planetary gear are fitted sequentially in an axial direction;

two ends of the planetary pin are fixedly connected with fixing parts in the drum body;

the planetary pins of the N planetary dual-gear sets are arranged in parallel;

wherein, input tooth segments of the N first-stage planetary dual-gears are simultaneously engaged with the output gear shaft in transmission way, and are evenly distributed along a circumference centered on the output gear shaft; output tooth segments of the N first-stage planetary dual-gears are simultaneously engaged with an input tooth segment of the first-stage sun dual-gear in transmission way, an output tooth segment of the first-stage sun dual-gear is simultaneously engaged with input tooth segments of the N second-stage planetary dual-gears in transmission way, output tooth segments of the N second-stage planetary dual-gears are simultaneously engaged with an input tooth segment of the second-stage sun dual-gear in transmission way till an output tooth segment of the last-stage sun dual-gear is simultaneously engaged with N output planetary gears in transmission way, the N output planetary gears are simultaneously engaged with the gear ring in transmission way, and the gear ring is connected with the drum body and arranged coaxially with the drum body; and wherein N is greater than or equal to 3; and wherein the fixing parts comprise a stator bracket and a threading shaft bracket that are respectively located at the two ends of the drum body;

the stator bracket is fitted with the output gear shaft in the interior via a bearing component, one external end of the stator bracket is used for mounting a stator of the motor, and the other external end of the stator bracket is provided with a connecting part; and a threading channel is formed inside the threading shaft bracket, and the threading shaft bracket is connected externally with a support sleeve via a bearing component, and the support sleeve is connected and arranged coaxially with the drum body.

2. The electric drum of claim 1, wherein each planetary pin is in clearance fit with the planetary dual-gears sleeved thereon; and an end face of at least one end of the planetary dual-gear is provided with an oil guide groove, one end of the oil guide groove is in communication with an inner hole of the planetary dual-gear for fitting with the planetary pin, and the other end of the oil guide groove is in communication with an outer circumferential wall of the planetary dual-gear.

3. The electric drum of claim 1, wherein the sun dual-gear is a solid gear structure without any inner hole.

4. The electric drum of claim 1, wherein the fixing parts at the two ends of the planetary pin are provided with axial limiting surfaces, which respectively limit the at least one stage of planetary dual-gears and the output planetary gear on the planetary pin in the axial direction.

5. The electric drum of claim 1, wherein the connecting part is fitted externally with a reduction housing via a bearing component; and the reduction housing is connected with one end of the support sleeve, and the other end of the support sleeve is connected with a cover to seal the drum body.

6. The electric drum of claim 1, wherein the gear ring is located on an inner wall of the support sleeve, and is fixedly connected or integrally formed with the inner wall of the support sleeve.

7. The electric drum of claim 1, wherein the motor is an internal-rotor motor or an external-rotor motor.

8. An electric drum, comprising a drum body, wherein, the drum body is provided with a motor and a dual-gear reduction mechanism connected with the motor in transmission way, and an output end of the dual-gear reduction mechanism is connected with the drum body, wherein the structure of the dual-gear reduction mechanism comprises at least one stage of sun dual-gear, N planetary dual-gear sets and a gear ring;

the at least one stage of sun dual-gear is coaxially arranged with an output gear shaft of the motor;

the N planetary dual-gear sets surround the at least one stage of sun dual-gear, and the structure of each planetary dual-gear set is:

each planetary dual-gear set comprises a planetary pin, on which at least one stage of planetary dual-gears and an output planetary gear are fitted sequentially in an axial direction;

two ends of the planetary pin are fixedly connected with fixing parts in the drum body;

the planetary pins of the N planetary dual-gear sets are arranged in parallel;

wherein, input tooth segments of the N first-stage planetary dual-gears are simultaneously engaged with the output gear shaft in transmission way, and are evenly distributed along a circumference centered on the output gear shaft; output tooth segments of the N first-stage planetary dual-gears are simultaneously engaged with an input tooth segment of the first-stage sun dual-gear in transmission way, an output tooth segment of the first-stage sun dual-gear is simultaneously engaged with input tooth segments of the N second-stage planetary dual-gears in transmission way, output tooth segments of the N second-stage planetary dual-gears are simultaneously engaged with an input tooth segment of the second-stage sun dual-gear in transmission way till an output tooth segment of the last-stage sun dual-gear is simultaneously engaged with N output planetary gears in transmission way, the N output planetary gears are simultaneously engaged with the gear ring in transmission way, and the gear ring is connected with the drum body and arranged coaxially with the drum body; and wherein N is greater than or equal to 3; and wherein the planetary pin is fixedly connected with the fixing parts via a cage-type gear box support;

a space for accommodating the at least one stage of sun dual-gear and the N planetary dual-gear sets is formed inside the cage-type gear box support;

two ends of the cage-type gear box support are respectively connected with the fixing parts;

the two ends of the cage-type gear box support are correspondingly provided with assembly holes, for tightly fitting with the planetary pin;

one or more connecting posts are arranged on the circumferential side of the cage-type gear box support, and a threading channel is formed inside the connecting post.

9. The electric drum of claim 8, wherein each planetary pin is in clearance fit with the planetary dual-gears sleeved thereon;

an end face of at least one end of the planetary dual-gear is provided with an oil guide groove, one end of the oil guide groove is in communication with an inner hole of the planetary dual-gear for fitting with the planetary pin, and the other end of the oil guide groove is in communication with an outer circumferential wall of the planetary dual-gear.

10. The electric drum of claim 8, wherein the sun dual-gear is a solid gear structure without any inner hole.

11. The electric drum of claim 8, wherein the fixing parts at the two ends of the planetary pin are provided with axial limiting surfaces, which respectively limit the at least one stage of planetary dual-gears and the output planetary gear on the planetary pin in the axial direction.

12. The electric drum of claim 8, wherein the connecting part is fitted externally with a reduction housing via a bearing component; and the reduction housing is connected with one end of the support sleeve, and the other end of the support sleeve is connected with a cover to seal the drum body.

13. The electric drum of claim 8, wherein the gear ring is located on an inner wall of the support sleeve, and is fixedly connected or integrally formed with the inner wall of the support sleeve.

14. The electric drum of claim 8, wherein the motor is an internal-rotor motor or an external-rotor motor.

15. An electric drum, comprising a drum body, wherein, the drum body is provided with a motor and a dual-gear reduction mechanism connected with the motor in transmission way, and an output end of the dual-gear reduction mechanism is connected with the drum body, wherein the structure of the dual-gear reduction mechanism comprises at least one stage of sun dual-gear, N planetary dual-gear sets and a gear ring;

the at least one stage of sun dual-gear is coaxially arranged with an output gear shaft of the motor;

the N planetary dual-gear sets surround the at least one stage of sun dual-gear, and the structure of each planetary dual-gear set is:

each planetary dual-gear set comprises a planetary pin, on which at least one stage of planetary dual-gears and an output planetary gear are fitted sequentially in an axial direction;

two ends of the planetary pin are fixedly connected with fixing parts in the drum body;

the planetary pins of the N planetary dual-gear sets are arranged in parallel;

wherein, input tooth segments of the N first-stage planetary dual-gears are simultaneously engaged with the output gear shaft in transmission way, and are evenly distributed along a circumference centered on the output gear shaft; output tooth segments of the N first-stage planetary dual-gears are simultaneously engaged with an input tooth segment of the first-stage sun dual-gear in transmission way, an output tooth segment of the first-stage sun dual-gear is simultaneously engaged with input tooth segments of the N second-stage planetary dual-gears in transmission way, output tooth segments of the N second-stage planetary dual-gears are simultaneously engaged with an input tooth segment of the second-stage sun dual-gear in transmission way till an output tooth segment of the last-stage sun dual-gear is simultaneously engaged with N output planetary gears in transmission way, the N output planetary gears are simultaneously engaged with the gear ring in transmission way, and the gear ring is connected with the drum body and arranged coaxially with the drum body; and wherein N is greater than or equal to 3; and wherein one or more threading tubes are arranged inside the drum body, and two ends of each threading tube are respectively connected with the fixing parts.

16. The electric drum of claim 15, wherein each planetary pin is in clearance fit with the planetary dual-gears sleeved thereon;

an end face of at least one end of the planetary dual-gear is provided with an oil guide groove, one end of the oil guide groove is in communication with an inner hole of the planetary dual-gear for fitting with the planetary pin, and the other end of the oil guide groove is in communication with an outer circumferential wall of the planetary dual-gear.

17. The electric drum of claim 15, wherein the sun dual-gear is a solid gear structure without any inner hole.

18. The electric drum of claim 15, wherein the fixing parts at the two ends of the planetary pin are provided with axial limiting surfaces, which respectively limit the at least one stage of planetary dual-gears and the output planetary gear on the planetary pin in the axial direction.

19. The electric drum of claim 15, wherein the connecting part is fitted externally with a reduction housing via a bearing component; and the reduction housing is connected with one end of the support sleeve, and the other end of the support sleeve is connected with a cover to seal the drum body.

20. The electric drum of claim 15, wherein the gear ring is located on an inner wall of the support sleeve, and is fixedly connected or integrally formed with the inner wall of the support sleeve.

21. The electric drum of claim 15, wherein the motor is an internal-rotor motor or an external-rotor motor.

* * * * *